(12) United States Patent
Mathew et al.

(10) Patent No.: US 11,868,353 B1
(45) Date of Patent: Jan. 9, 2024

(54) FINGERPRINTS FOR DATABASE QUERIES

(71) Applicant: HEWLETT PACKARD ENTERPRISE DEVELOPMENT LP, Houston, TX (US)

(72) Inventors: Shine Mathew, Karnataka (IN); Ashish Dange, Karnataka (IN); Harsh Singh, Karnataka (IN); Lakshmi Pathy, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/811,097

(22) Filed: Jul. 7, 2022

(51) Int. Cl.
*G06F 16/2455* (2019.01)
*G06F 11/34* (2006.01)
*G06F 16/242* (2019.01)

(52) U.S. Cl.
CPC .... *G06F 16/24561* (2019.01); *G06F 11/3414* (2013.01); *G06F 16/2425* (2019.01)

(58) Field of Classification Search
CPC ......... G06F 16/24561; G06F 16/24245; G06F 16/3414
See application file for complete search history.

(56) References Cited

U.S. PATENT DOCUMENTS

| | | | |
|---|---|---|---|
| 7,002,573 B2 * | 2/2006 | Trotta | G06T 15/10 345/420 |
| 8,572,041 B2 | 10/2013 | Sarashetti | |
| 9,647,836 B2 * | 5/2017 | Paris | H04L 63/0428 |
| 10,628,298 B1 | 4/2020 | Chinthekindi et al. | |
| 11,256,694 B2 | 2/2022 | Mathew | |
| 2004/0140991 A1 | 7/2004 | Trotta et al. | |
| 2005/0091195 A1 | 4/2005 | Sarashetti | |
| 2013/0132453 A1 | 5/2013 | Mitra | |
| 2016/0357979 A1 | 12/2016 | Paris et al. | |

FOREIGN PATENT DOCUMENTS

| | | |
|---|---|---|
| JP | 2008-171316 A | 7/2008 |
| JP | 4632056 B2 | 2/2011 |
| WO | 03/81461 A1 | 10/2003 |

* cited by examiner

*Primary Examiner* — Baoquoc N To
(74) *Attorney, Agent, or Firm* — Yao Legal Services, Inc.

(57) ABSTRACT

In some examples, a system identifies sub-portions of a database query, assigns identifiers to the identified sub-portions, and adds the identifiers to a data structure. The system generates a fingerprint representing the database query based on applying a fingerprint function on the data structure including the identifiers.

20 Claims, 5 Drawing Sheets

FINGERPRINTS FOR DATABASE QUERIES

BACKGROUND

A relational database stores data that is organized into relations (also referred to as "tables") organized as rows and columns. Rows are also referred to as tuples or records, and columns are also referred to as attributes. A relational database management system (RDBMS) can manage the access (read, write, and other operations) with respect to data stored in tables up of a relational database.

BRIEF DESCRIPTION OF THE DRAWINGS

Some implementations of the present disclosure are described with respect to the following figures.

Figure 1:
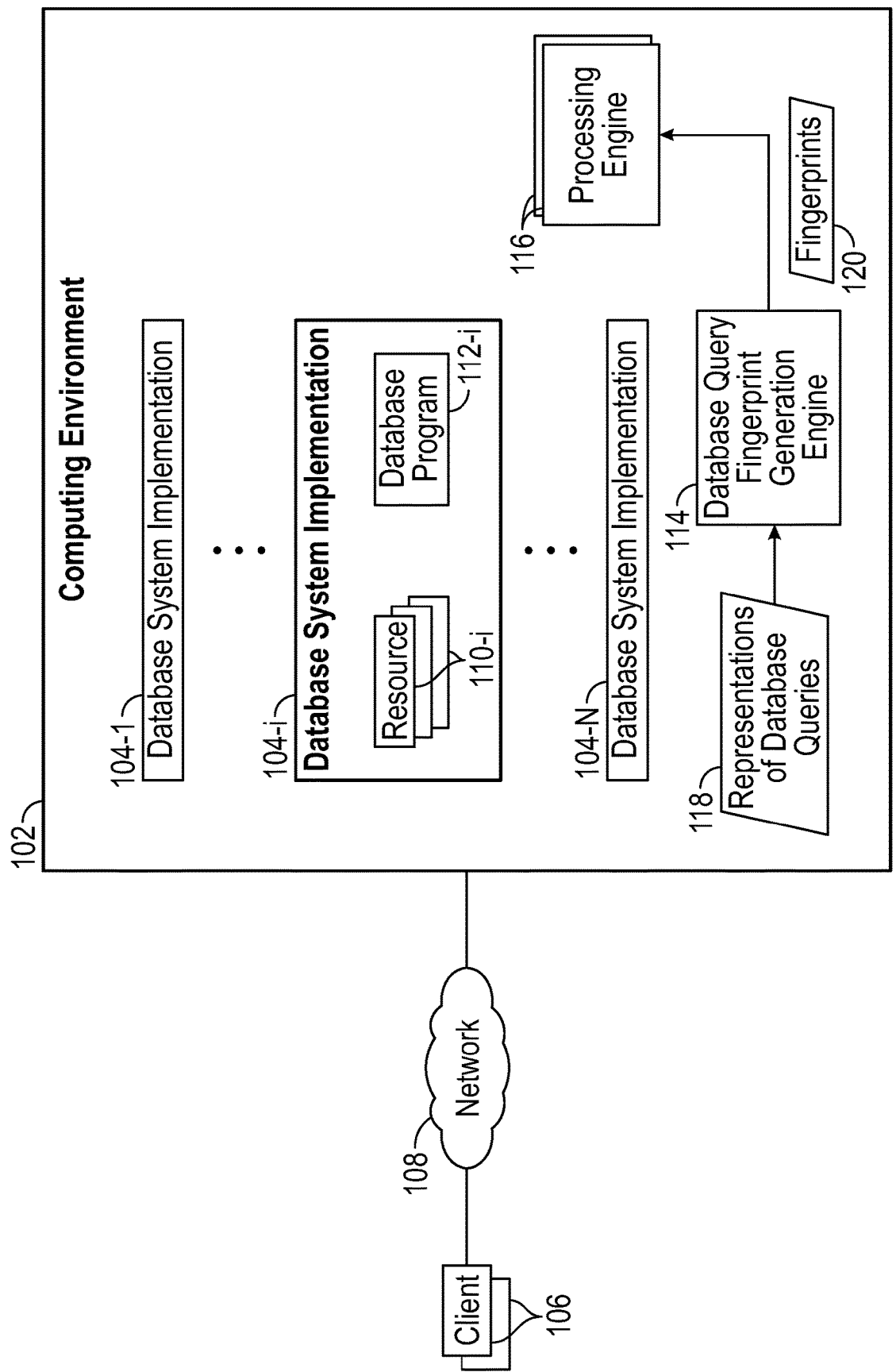
FIG. 1 is a block diagram of an arrangement that includes a database query fingerprint generation engine that produces fingerprints for database queries used in database system implementations, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Database queries can be processed by database systems, such as relational database management systems (RDBMS), to perform operations on data stored in the database systems. Examples of database queries can include statements according to the Structured Query Language (SQL). SQL statements can be submitted to request the performance of database operations such as a join operation (which joins multiple tables), a union operation (which combines results of multiple database operations), a sort operation (which sorts rows of table(s) according to values of a collection of attributes (where "collection" of attributes can refer to a single attribute or multiple attributes), a scan operation (to perform a serial scan of rows of a table), an intersect operation (to identify the intersection of results produced by database operations), and so forth.

As used here, a "collection" of items can refer to a single item or multiple items.

Generally, the SQL syntax can define various different commands, operators, attributes, etc., to perform any of various different database operations on data stored in a collection of tables (a single table or multiple tables).

Workload management can be performed with respect to database systems. Examples of workload management tasks that can be performed by a workload management system can include any or some combination of the following: monitoring workload(s) in a database system, where a workload can include a collection of database operations; distributing tasks of workload(s) across multiple computer nodes of a database system to balance the workload(s) across the computer nodes; identifying characteristics of workload(s) such as runtimes of the workload(s), utilizations of resources (e.g., processor resources, storage resources, communication resources, etc.) by the workload(s), etc.; predicting an expected load on a database system when executing database queries, so that resources can be allocated to the workloads for the database queries based on the prediction; and so forth.

A "workload" can refer to a collection of tasks executed in response to a collection of database queries (such as SQL statements).

In some examples, workload management can be implemented as part of an "as a service" model, in which a service provider provides a computing infrastructure to support database operations requested by any of various clients of the service provider. As examples, the computing infrastructure to support database operations can be provided in the cloud or in a data center. Clients (sometimes also referred to as "tenants") can be granted access to the computing infrastructure on a request basis, where a client that desires to perform database operation(s) can access the computing infrastructure to submit a collection of database queries to the computing infrastructure to perform target database operation(s). For example, clients can access the computing infrastructure on a subscription basis (in which clients can subscribe by paying a subscription fee to access the computing infrastructure). Alternatively, clients can access the computing infrastructure on a per-use basis and pay for actual usage of the computing infrastructure.

The service provider may perform workload management to ensure that the computing environment is being used in an efficient manner that satisfies target service levels for clients. In some examples, workload management can be based on database queries (e.g., SQL statements) that are to be executed to perform database operations.

In some cases, workload management may be performed based on identifiers of database queries. Given a collection of database queries determined based on their identifiers, a workload management system can determine the database operation(s) to be performed for the collection of database queries, and can perform workload management tasks (such as those listed above) for the database operation(s).

Database queries in different database system implementations may assign different identifiers to the same database query or to similar database queries. "Similar" database queries can refer to database queries that differ in an aspect that does not affect the type of database operation(s) or characteristics of the database operation(s) performed in response to the similar database queries. For example, a first database query and a second database query can be identical except that a predicate (e.g., in the form of a WHERE clause) in the first and second database queries differ in the values of constants. For example, the WHERE clause of the first database query can specify WHERE T1.A=2, while the WHERE clause of the second database query can specify WHERE T1.A=10 (T1 in this example represents a table, and A represents an attribute in the table). The first and second database queries that are identical except for the use of different constants (2 versus 10). In some examples, this difference in constants in the predicates of the first and second database queries may not significantly change the workload produced in a database system, so that in terms of workload management, the first and second database queries can be treated as being identical.

A "database system implementation" can refer to a physical database system or a virtual database system in which workloads are to be performed in response to database queries from a client. In an "as a service" environment, a computing infrastructure (e.g., a cloud computing infrastructure, a data center, etc.) can implement multiple database system implementations that can be used by corresponding clients. In some examples, a first database system implementation can include a first collection of resources (e.g., processor resources, storage resources, communication resources, virtual resources, etc.) and a database program from a first vendor, a second database system implementation can include a second collection of resources (e.g., processor resources, storage resources, communication resources, virtual resources, etc.) and a database program from a second vendor (which may be the same as or different from the first vendor), and so forth.

Database system implementations can differ in terms of the database programs used, or in terms of different resources used, and so forth.

As used here, "identical" database queries to be executed in multiple database system implementations can refer to exactly the same database query to be executed in multiple database system implementations, or "similar" database queries to be executed in multiple database system implementations.

If identical database queries are assigned different identifiers because the identical database queries are used in different database system implementations, then inconsistent workload management may be performed, because the workload management system may assume that database queries with different identifiers cause performance of different types of database operations with different characteristics (e.g., different runtimes, different resource utilization, etc.).

In other examples, in addition to or instead of workload management, other processes may perform tasks based on identifiers of database queries.

In accordance with some implementations of the present disclosure, techniques or mechanisms are provided to generate a unique and consistent fingerprint of a fixed length for identical database queries (e.g., SQL statements) in different database system implementations. A "fingerprint" refers to a value derived based on applying a process on input information (e.g., a SQL statement). A fingerprint generated for a database query is used as an identifier of the database query, where the identifier can be used by a workload management system or another type of system.

The ability to generate unique and consistent fingerprints as identifiers of database queries used in database system implementations can allow for more accurate identification of database queries, where the same or similar database queries in the database system implementations are assigned the same identifier.

In some examples of the present disclosure, a unique fingerprint for a database query is generated by identifying sub-portions of the database query, where the sub-portions can include expressions, predicates, projections, commands, operators, attributes, constants (or placeholders representing constants), and so forth. Identifiers are assigned to the sub-portions, and the identifiers can be collected, such as by appending or otherwise adding the identifiers to a data structure of variable length. An "identifier" assigned to a sub-portion of a database query can refer to any value (including numbers, alphabet characters, symbols, etc.) assigned to the sub-portion. A fingerprint function is applied to the collection of the identifiers to generate a fingerprint that is used to uniquely identify the database query. Examples of fingerprint functions are discussed further below.

Examples of various sub-portions of a database query, such as a SQL statement, are listed below.

An "expression" in a database query can refer to a combination of one or more values, operators, and possibly functions that evaluate to a value or a set of values.

An example SQL statement is set forth below:
SELECT [Expression 1]
FROM T1
WHERE [Expression 2];

In the WHERE clause of the example SQL statement above, Expression 2 may be a Boolean expression that specifies a condition that is to be satisfied (e.g., T1.A=5) to produce an output by the SQL statement. Expression 1 can be a numeric expression, such as (2+8), which sums the value 2 with the value 8. Alternatively, Expression 1 can include a function, such as COUNT() (which counts a number of rows of that match a criterion), AVG() (which averages multiple values), and so forth. In other examples, a SQL statement can include other types of expressions.

A SQL statement can also include SQL commands to perform specified database operations. An example SQL command is a SELECT command, which identifies table column(s) or other values to output. Another example SQL command is a GROUP BY command, which combines rows by aggregating column values in those rows. Yet another example SQL command is an ORDER BY command, which sorts values listed in the SELECT command. Yet a further example SQL command is a UNION command, which combines results of multiple database operations, such as values selected in multiple SELECT commands. A further example SQL command is a SCAN command, which performs a serial scan of rows of a table. Yet another example SQL command is an INTERSECT command, which identifies the intersection of results produced by database operations). There are other SQL commands not listed above.

A SQL statement can further include operators. For example, in a predicate (e.g., a WHERE clause) that specifies T1.A=5, "=" is an example of a comparison operator to check if a value of a first operand (T1.A) is equal to a value of a second operand (5). Another example comparison operator includes "!=" or "<>", which is an inequality operator that determines whether a first operand is not equal to a second operand. Additional comparison operators can include ">", "<", and so forth.

Another sub-portion of a SQL statement that can be present is a predicate, such as WHERE T1.A=5.

A further sub-portion of a SQL statement includes a projection, which includes the column(s) or other value(s) returned by the SQL statement, such as the column(s) or other value(s) of the SELECT command.

Yet another sub-portion of a SQL statement can include an attribute (or a group of attributes) of a table (or multiple tables).

Another sub-portion of a SQL statement can include a constant (or a placeholder representing the constant). A constant is a fixed numeric value. A placeholder representing a constant can be a representation of the constant, where this representation is the same regardless of the value of the constant. For example, a placeholder "X" can represent any numeric value 0, 1, 2, etc.

Although some example sub-portions of database queries are listed above, there are many other examples of sub-portions of database queries.

FIG. 1 is a block diagram of an example arrangement that includes a computing environment 102 that includes multiple database system implementations 104-1, . . . , 104-i, . . . , and 104-N, where N≥2. In the example, the parameter "i" can represent any value between and including 1 and N.

In the computing environment 102, which can be a cloud computing infrastructure (that provides database system implementations as-a-service, for example), a data center, etc., each database system implementation 104 can include a physical database system or a virtual database system. A physical database system is made up of the collection of computer nodes to execute database operations on behalf of a client 106. A virtual database system is a virtualized computing environment in which database operations can be performed. A virtualized computing environment can include a virtual machine, a container, and so forth. Virtualized computing environments can share physical resources of a computing infrastructure.

In some examples, the computing environment 102 provides database system implementations for executing database operations in response to database queries, such as those submitted by clients 106.

A "client" can refer to a user (or a group of users), a program (or a group of programs), or a machine (or a group of machines).

Each client 106 can submit database queries over a network 108 to the computing environment 102 to trigger the performance of database operations. The network 108 can include a local area network (LAN), a wide area network (WAN), a public network such as the Internet, and so forth.

The database system implementation 104-i includes various resources 110-i. If the database system implementation 104-i is a physical database system, then the resources 110-i are physical resources (e.g., physical processor resources, physical storage resources, physical communication resources, etc.). If the database system implementation 104-i is a virtual database system, then the resources 110-i are virtual resources that can be allocated to the virtual database system on demand, such as by a hypervisor or a virtual machine monitor (VMM). The database system implementation 104-i also executes a database program 112-i. The database program 112-i can include a DBMS program, for example, which manages the execution of database operations in response to database queries.

The other database system implementations 104-1 and 104-N also similarly include respective resources and database programs. In some examples, different database system implementations may execute database programs from different vendors, or may include different collections of resources.

The computing environment 102 also includes a database query fingerprint generation engine 114 and a processing engine 116 (or multiple processing engines 116). Alternatively, the database query fingerprint generation engine 114 and/or the processing engine(s) 116 are external of the computing environment 102. In some examples, a processing engine 116 can be a workload management engine to perform workload management. In other examples, a processing engine 116 can perform another type of process, such as a process to log database queries or generate reports or other analyses of database queries, and so forth.

As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

The database query fingerprint generation engine 114 generates fingerprints for database queries that can be executed by the database system implementations 104-1 to 104-N.

The database query fingerprint generation engine 114 receives representations of database queries 118. The database queries can be those submitted by the clients 106 to the computing environment 102 to perform database operations. Alternatively, or additionally, the database queries can include historical database queries that have been received in the past by the computing environment 102.

The representations of database queries 118 can include the database queries themselves, such as SQL statements. Alternatively, the representations of the database queries 118 can include indicators of where the database queries are stored, such that the database query fingerprint generation engine 114 can retrieve the database queries from the storage locations.

Fingerprints 120 for respective database queries are provided by the database query fingerprint generation engine 114 to the processing engine(s) 116. Based on the fingerprints that constitute unique identifiers of the database queries, a processing engine 116 that is a workload management engine can perform management tasks, such as any of or some combination of the management tasks discussed further above.

In further examples, the fingerprints 120 can be provided to another processing engine 116 to perform other tasks based on the fingerprints 120, such as to log database queries or generate reports or other analyses of database queries.

Figure 2:
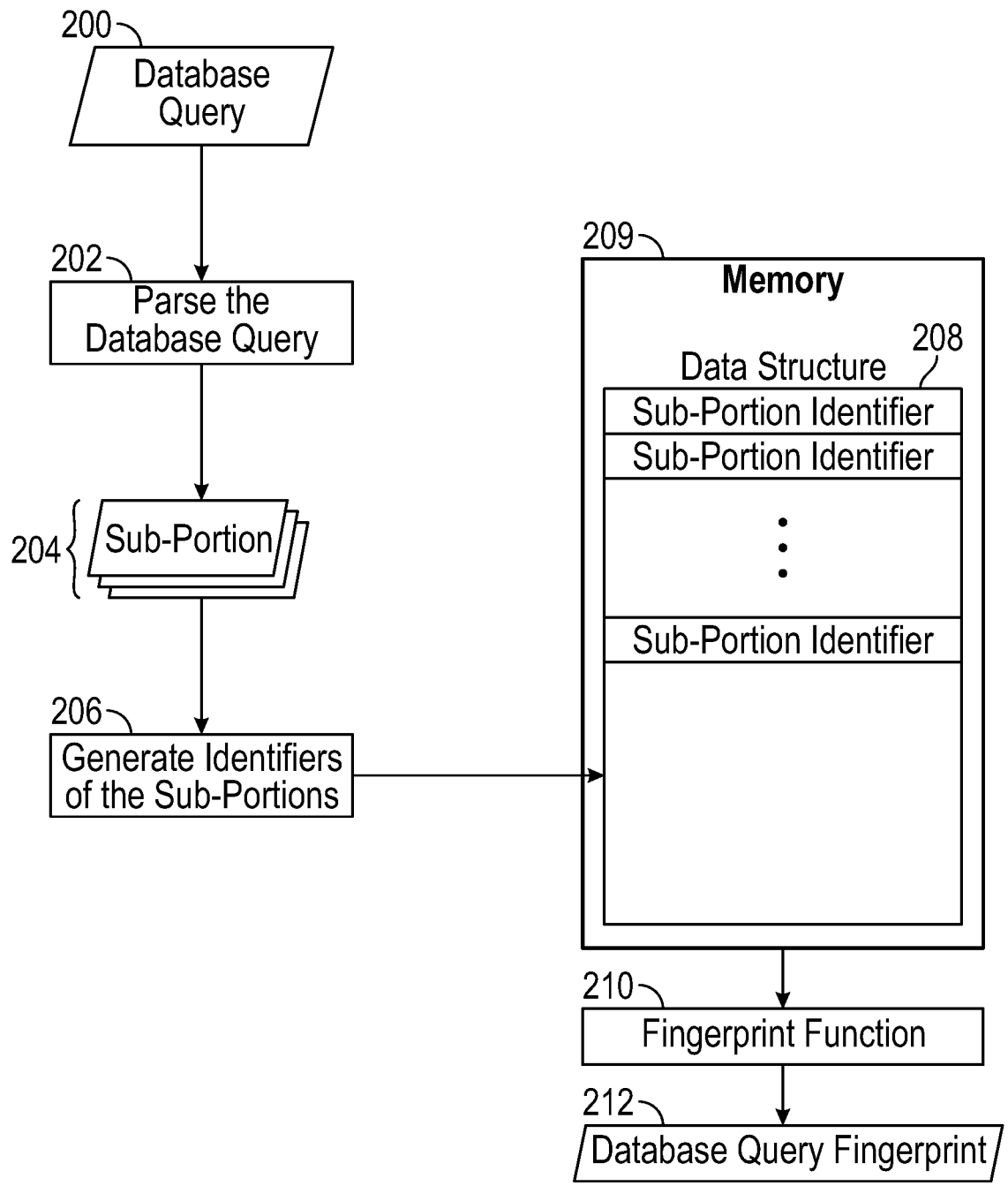
FIG. 2 illustrates a process of adding identifiers of sub-portions of a database query into a data structure, and producing a fingerprint based on the identifiers in the data structure, in accordance with some examples.

FIG. 2 illustrates an example process of producing a database query fingerprint for a database query 200 that is received by the database query fingerprint generation engine 114. The database query fingerprint generation engine 114 parses (at 202) the database query 200 into a collection 204 of the sub-portions of the database query 200. The parsing performed by the database query fingerprint generation engine 114 can be similar to the parsing performed by a parser of a database program (e.g., a DBMS program). For example, the database query fingerprint generation engine 114 can parse the database query 200 into a tree representation of the sub-portions of the database query 200. The tree representation can be in the form of a parse tree that includes nodes arranged in a hierarchical structure, where each node represents a respective sub-portion of the database query 200.

The database query fingerprint generation engine 114 generates (at 206) identifiers for respective sub-portions in the collection 204 of sub-portions. For example, the database query fingerprint generation engine 114 generates a sub-portion identifier for each sub-portion represented by a node in the tree representation of the database query. In some examples, the database query fingerprint generation engine 114 can assign sub-portion identifiers to respective sub-portions of a database query by accessing mapping information (e.g., a lookup table) that maps different sub-portions (e.g., expressions, predicates, projections, commands, operators, attributes, constants (or placeholders representing constants), etc.) to respective sub-portion identifiers that uniquely identify the respective sub-portions.

In other examples, the database query fingerprint generation engine 114 can assign sub-portion identifiers to respective sub-portions of a database query by applying a function (e.g., a hash function, etc.) to the respective sub-portions, where an output value produced by the function is a unique identifier of a corresponding sub-portion.

The identifiers of the respective sub-portions are added (e.g., appended) to a data structure 208. The data structure 208 may be stored in a memory 209, which can include a collection of memory devices such as dynamic random access memory (DRAM) devices, static random access memory (SRAM) devices, flash memory devices, disk-based storage devices, solid-state drives, etc.

In some examples, the data structure 208 can be in the form of an array. As each sub-portion identifier is generated by the database query fingerprint generation engine 114, the sub-portion identifier is appended to the end of the array. The data structure 208 can have a variable length that is able to hold an arbitrary quantity of sub-portion identifiers. Different database queries can have different quantities of sub-portions that result in different quantities of sub-portion identifiers. The variable length of the data structure 208 enables storage of an arbitrary quantity of sub-portion identifiers.

More generally, the data structure 208 can represent any portion of the memory 209 that can be used to hold the sub-portion identifiers. The data structure 208 can refer to any collection of sub-portion identifiers produced by the database query fingerprint generation engine 114.

The data structure 208 including the sub-portion identifiers is provided as an input to a fingerprint function 210, which may be part of the database query fingerprint generation engine 114 or which may be separate from but invoked by the database query fingerprint generation engine 114. The fingerprint function 210 is applied to the content (i.e., the sub-portion identifiers) of the data structure 208. In some examples, the fingerprint function 210 is a hash function, such as a cryptographic hash function that can produce a cryptographic hash value based on input information, which in this case is the content of the data structure 208. An example of a cryptographic hash function is a Secure Hash Algorithm (SHA) algorithm. Another cryptographic hash function is a message-digest 5 (MD5) function.

In other examples, other types of fingerprint functions can be used, such as a checksum function or another type of function.

The fingerprint function 210 produces a fixed-length database query fingerprint 212 based on the content of the data structure 208. Any database query fingerprint produced by the fingerprint function 210 has a fixed length (e.g., fixed quantity of bits) regardless of the length of the input information, which in this case is the data structure 208.

Figure 3:
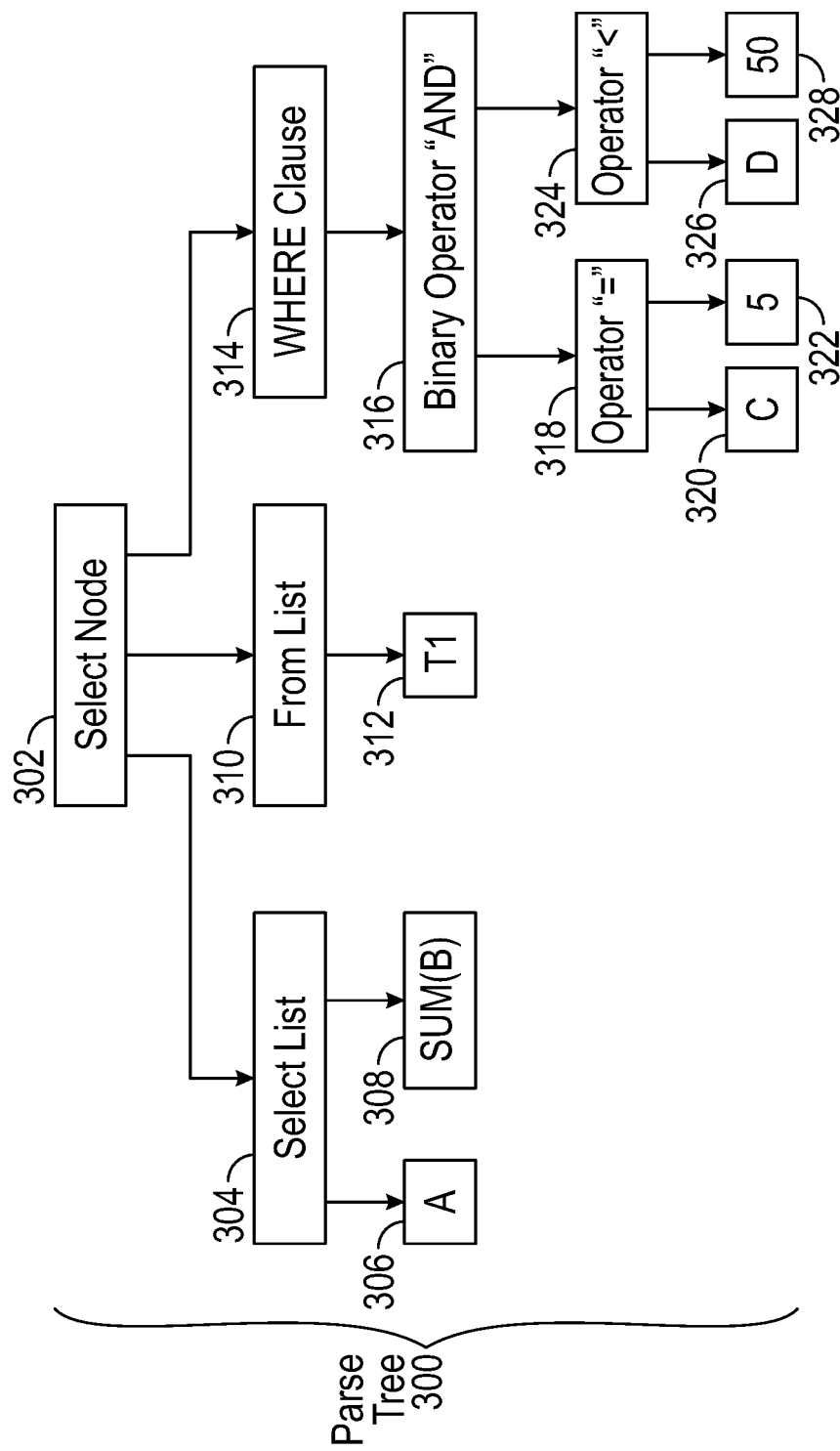
FIG. 3 is a schematic diagram of a parse tree including nodes representing sub-portions for a database query, for which identifiers can be assigned according to some examples.

FIG. 3 depicts an example parse tree 300 produced by the parsing (at 202) in FIG. 2. In an example, the parse tree 300 can be produced based on parsing the following example SQL statement:
SELECT A, SUM(B)
FROM T1
WHERE C=5 AND D<50;

A Select node 302 in the parse tree represents the SELECT command. The SELECT command has a select list represented by a Select List node 304. The select list represented by the Select List node 304 includes the projection of output values to be returned by the SELECT statement.

The select list includes attribute A represented by an Attribute node 306, and an expression represented by an Expression node 308. The expression represented by the Expression node 308 includes a function, SUM(B), that sums the values of attribute B in table T1 that satisfy the predicate (the WHERE clause) of the SELECT statement.

A From List node 310 represents a from list in the SELECT statement. The from list includes table T1 as represented by a Table node 312.

The SELECT statement also includes a predicate that includes the WHERE clause, as represented by a WHERE Clause node 314. The predicate includes a binary operator "AND" represented by a Binary Operator node 316. The binary operator "AND" performs a logical AND of a condition C=5 and a condition D<50.

The condition C=5 includes a comparison operator "=" represented by a Comparison Operator node 318. The condition C=5 also includes a first operand C represented by an Attribute node 320, and a second operand 5 represented by a Constant node 322.

Similarly, the condition D<50 includes a comparison operator "<" represented by a Comparison Operator node 324. The condition D<50 also includes a first operand D represented by an Attribute node 326, and a second operand 50 represented by a Constant node 328.

In other examples, instead of representing different values of constants in the parse tree 300, a placeholder for the constants can be represented instead using a Placeholder node.

The nodes of the parse tree 300 represent different sub-portions of the SELECT statement. Note a sub-portion may itself have multiple sub-portions. For example, the WHERE Clause node 314 represents a predicate, which is one sub-portion. The predicate has multiple sub-portions, including the binary operator "AND" represented by the node 316, the comparison operators represented by the nodes 318 and 324, the attributes represented by the nodes 320 and 326, and the constants represented by the nodes 322 and 328.

The database query fingerprint generation engine 114 can generate an identifier for each of the sub-portions represented by the nodes of the parse tree 300. As each sub-portion identifier is generated, the database query fingerprint generation engine 114 adds the sub-portion identifier to a data structure, such as the data structure 208 of FIG. 2.

Figure 4:
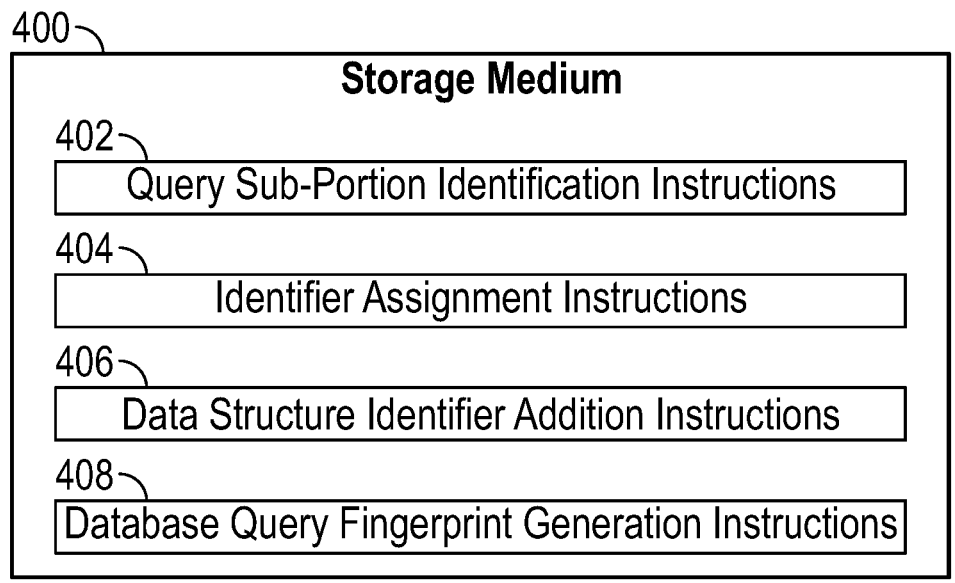
FIG. 4 is the block diagram of a storage medium storing machine-readable instructions according to some examples.

FIG. 4 is a block diagram of a non-transitory machine-readable or computer-readable storage medium 400 storing machine-readable instructions that upon execution cause a system to perform various tasks. The system can include a computer or multiple computers.

The machine-readable instructions include query sub-portion identification instructions 402 to identify sub-portions of a database query.

In some examples, the machine-readable instructions can parse the database query into the sub-portions, and represent the sub-portions as nodes of a parse tree (e.g., the parse tree 300 of FIG. 3). The identifying of the sub-portions in the database query includes identifying the sub-portions represented by the nodes of the parse tree.

The machine-readable instructions include identifier assignment instructions 404 to assign identifiers to the identified sub-portions. In some examples, the machine-readable instructions can generate the identifiers by applying a function to the identified sub-portions, or by accessing mapping information that maps sub-portions to sub-portion identifiers.

The machine-readable instructions include data structure identifier addition instructions 406 to add the identifiers to a data structure, such as the data structure 208 of FIG. 2. For example, the identifiers for the identified sub-portions can be added (e.g., appended) to the data structure, which can be variable length depending upon how many identifiers are added to the data structure.

The machine-readable instructions include database query fingerprint generation instructions 408 to generate a fingerprint representing the database query based on applying a fingerprint function on the data structure including the identifiers. The fingerprint function can be a hash function, a checksum function, or any other function. In some examples, the fingerprint function can generate a fixed length value to use as the fingerprint regardless of a length of the data structure.

In some examples, the identified sub-portions include an expression in the database query, where the fingerprint is based on applying the fingerprint function on the data structure including an identifier of the expression.

In some examples, the identified sub-portions include an operator in the database query, where the fingerprint is based on applying the fingerprint function on the data structure including an identifier of the operator.

In some examples, the identified sub-portions include a predicate in the database query, where the fingerprint is based on applying the fingerprint function on the data structure including an identifier of the predicate.

In some examples, the identified sub-portions include a projection in the database query, where the fingerprint is based on applying the fingerprint function on the data structure including an identifier of the projection.

In some examples, the identified sub-portions include a command in the database query, where the fingerprint is based on applying the fingerprint function on the data structure including an identifier of the command.

In some examples, the identified sub-portions include an attribute in the database query, where the fingerprint is based on applying the fingerprint function on the data structure including an identifier of the attribute.

In some examples, the identified sub-portions include a constant or a placeholder representing the constant, where the fingerprint is based on applying the fingerprint function on the data structure including an identifier of the constant or the placeholder.

In some examples, the machine-readable instructions perform a management process (e.g., a workload management process) based on the fingerprint, where the management process uniquely identifies the database query based on the fingerprint.

Figure 5:
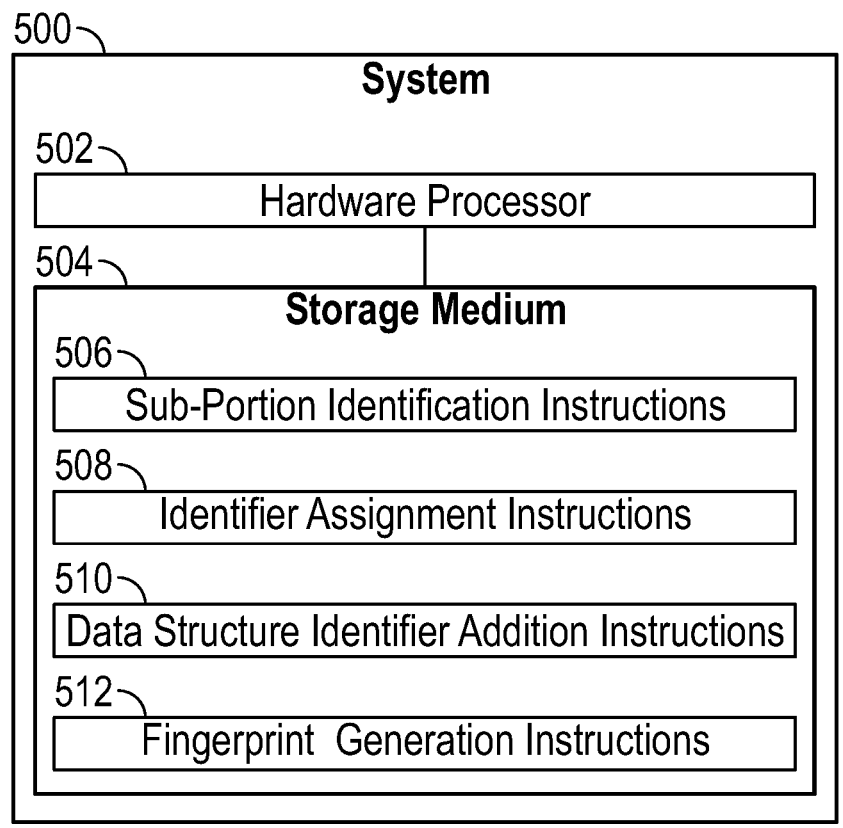
FIG. 5 is a block diagram of a system according to some examples.

FIG. 5 is a block diagram of a system 500, which may be a computer or multiple computers. The system 500 includes a hardware processor 502 (or multiple hardware processors). A hardware processor can include a microprocessor, a core of a multi-core microprocessor, a microcontroller, a programmable integrated circuit, a programmable gate array, or another hardware processing circuit.

The system 500 includes a storage medium 504 storing machine-readable instructions executable on the hardware processor 502 to perform various tasks. Machine-readable instructions executable on a hardware processor can refer to the instructions executable on a single hardware processor or the instructions executable on multiple hardware processors.

The machine-readable instructions in the storage medium 504 include sub-portion identification instructions 506 to identify sub-portions of a database query, the identified sub-portions including a command. Note that the database query may additionally or alternatively include other types of sub-portions, such as a predicate and so forth.

The machine-readable instructions in the storage medium 504 include identifier assignment instructions 508 to assign identifiers to the identified sub-portions including the command (and possibly other sub-portions such as the predicate and so forth). In some examples, the machine-readable instructions generate the identifiers for the identified sub-portions based on one of: applying a function on the identified sub-portions to produce respective values that make up the identifiers, or accessing mapping information that maps sub-portions of database queries to identifiers.

The machine-readable instructions in the storage medium 504 include data structure identifier addition instructions 510 to add the identifiers to a data structure. For example, the identifiers may be appended to the data structure which may be in the form of an array.

The machine-readable instructions in the storage medium 504 include fingerprint generation instructions 512 to generate a fingerprint representing the database query based on applying a fingerprint function on the data structure including the identifiers.

Figure 6:
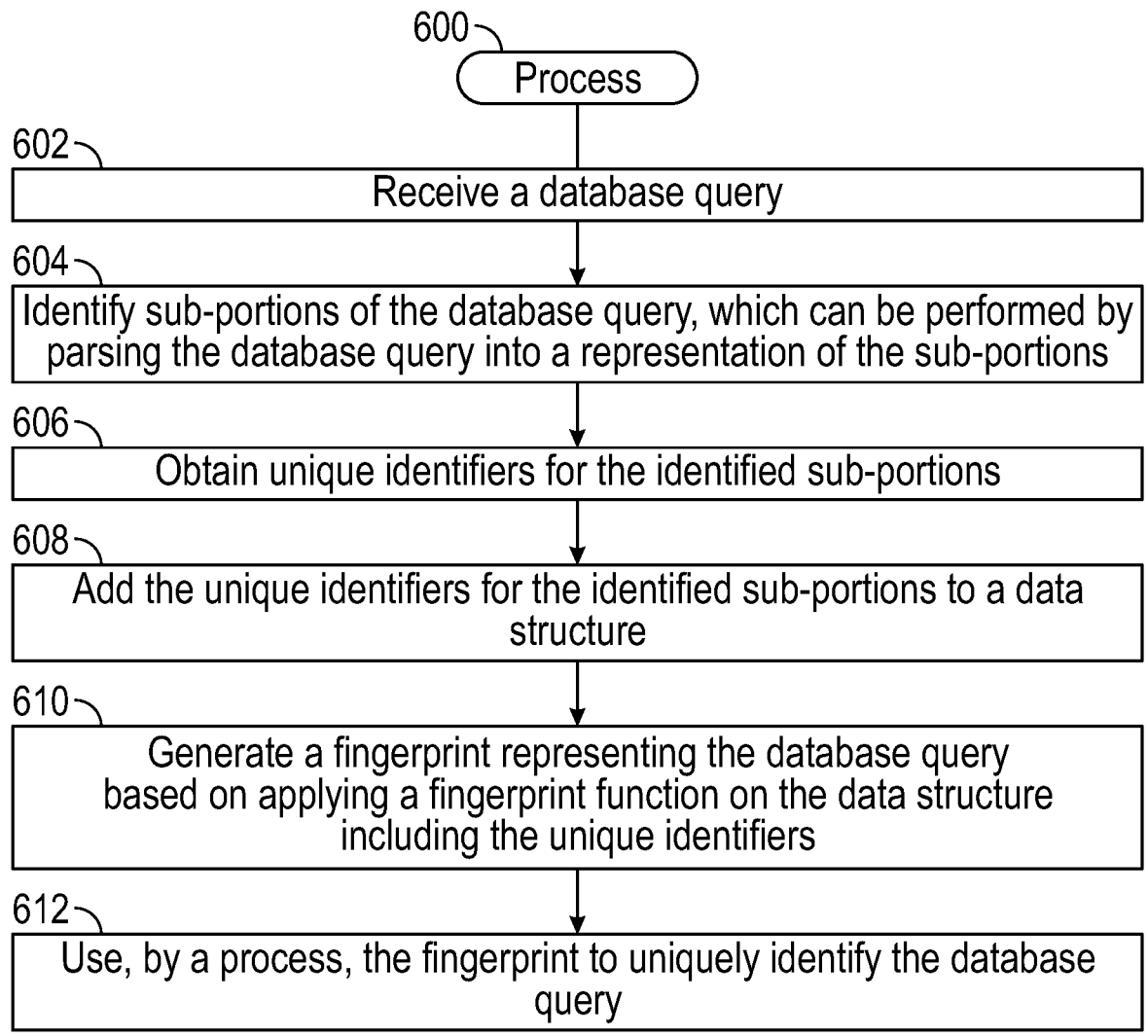
FIG. 6 is a flow diagram of a process according to some examples.

FIG. 6 is a flow diagram of a process 600 according to some examples, which may be performed by a system including a hardware processor.

The process 600 includes receiving (at 602) a database query.

The process 600 includes identifying (at 604) sub-portions of the database query, which can be performed by parsing the database query into a representation of the sub-portions. The representation can be in the form of a parse tree, for example.

The process 600 includes obtaining (at 606) unique identifiers for the identified sub-portions. For example, the process 600 can obtain unique identifiers for each sub-portion represented by a node in the parse tree. "Obtaining" unique identifiers for the identified sub-portions can refer to generating the identifiers (such as by applying a fingerprint function, or accessing the identifiers from a storage.

The process 600 includes adding (at 608) the unique identifiers for the identified sub-portions to a data structure of a variable length.

The process 600 includes generating (at 610) a fingerprint representing the database query based on applying a fingerprint function on the data structure including the unique identifiers. The fingerprint function produces a value of a fixed length as the fingerprint regardless of a length of the data structure. In some examples, a length of the data structure is dependent upon a quantity of the unique identifiers added in the data structure.

The process 600 includes using (at 612), by a process, the fingerprint to uniquely identify the database query. In some examples, the process can be a workload management process and/or another process.

A storage medium (e.g., 400 in FIG. 4 or 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
    receive a database query;
    identify sub-portions of the database query, wherein the sub-portions comprise one or more of an expression in the database query and an operator in the database query;
    assign identifiers to the identified sub-portions based on one of:
        accessing mapping information that maps different sub-portions to respective sub-portion identifiers that uniquely identify the respective sub-portions; and
        applying a function to the respective sub-portions, wherein an output value produced by the function comprises a unique identifier of a corresponding sub-portion;
    add the identifiers to a data structure;
    generate a fingerprint representing the database query based on applying a fingerprint function to the identifiers in the data structure; and
    perform a management process based on the generated fingerprint, wherein the management process uniquely identifies the database query based on the fingerprint.

2. The non-transitory machine-readable storage medium of claim 1, wherein the identifying of the sub-portions comprises identifying a first sub-portion and identifying further sub-portions of the first sub-portion, wherein the assigning of identifiers comprises assigning a first identifier to the first sub-portion and further identifiers to the further sub-portions, and
    wherein the fingerprint is based on applying the fingerprint function on the data structure including the first identifier and the further identifiers.

3. The non-transitory machine-readable storage medium of claim 1, wherein the identified sub-portions comprise an expression in the database query, and wherein the fingerprint is based on applying the fingerprint function on the data structure including an identifier of the expression.

4. The non-transitory machine-readable storage medium of claim 1, wherein the identified sub-portions comprise an operator in the database query, and wherein the fingerprint is based on applying the fingerprint function on the data structure including an identifier of the operator.

5. The non-transitory machine-readable storage medium of claim 1, wherein the identified sub-portions comprise a predicate in the database query, and wherein the fingerprint is based on applying the fingerprint function on the data structure including an identifier of the predicate.

6. The non-transitory machine-readable storage medium of claim 1, wherein the identified sub-portions comprise a projection in the database query, and wherein the fingerprint is based on applying the fingerprint function on the data structure including an identifier of the projection.

7. The non-transitory machine-readable storage medium of claim 1, wherein the identified sub-portions comprise a command in the database query, and wherein the fingerprint is based on applying the fingerprint function on the data structure including an identifier of the command.

8. The non-transitory machine-readable storage medium of claim 1, wherein the identified sub-portions comprise an attribute in the database query, and wherein the fingerprint is based on applying the fingerprint function on the data structure including an identifier of the attribute.

9. The non-transitory machine-readable storage medium of claim 1, wherein the identified sub-portions comprise a constant or a placeholder representing the constant, and wherein the fingerprint is based on applying the fingerprint function on the data structure including an identifier of the constant or the placeholder.

10. The non-transitory machine-readable storage medium of claim 1, wherein the data structure has a variable length, and wherein the fingerprint function is to output a value of a fixed length as a fingerprint regardless of a length of the data structure.

11. The non-transitory machine-readable storage medium of claim 1, wherein the identified sub-portions comprise Structured Query Language (SQL) elements.

12. The non-transitory machine-readable storage medium of claim 1, wherein the instructions upon execution cause the system to:
    parse the database query into the sub-portions; and
    represent the sub-portions as nodes of a parse tree,
    wherein the identifying of the sub-portions in the database query comprises identifying the sub-portions represented by the nodes of the parse tree.

13. The non-transitory machine-readable storage medium of claim 1, wherein the management process comprises a workload management process to manage a workload including database operations responsive to database queries, and wherein the workload management process uniquely identifies database queries based on fingerprints generated for the database queries.

14. The non-transitory machine-readable storage medium of claim 1, wherein the fingerprint function is based on one of:
    a hash function;
    a cryptographic hash function;
    a checksum function;
    a secure Hash Algorithm; and
    a message-digest 5 function.

15. A system comprising:
a processor; and
a non-transitory storage medium storing instructions executable on the processor to:
receive a database query;
identify sub-portions of the database query, the identified sub-portions comprising a command, wherein the identified sub-portions further comprise one or more of an expression in the database query and an operator in the database query;
assign identifiers to the identified sub-portions comprising the command based on one of:
accessing mapping information that maps different sub-portions to respective sub-portion identifiers that uniquely identify the respective sub-portions; and
applying a function to the respective sub-portions, wherein an output value produced by the function comprises a unique identifier of a corresponding sub-portion;
add the identifiers to a data structure; and
generate a fingerprint representing the database query based on applying a fingerprint function to the identifiers in the data structure; and
perform a management process based on the generated fingerprint, wherein the management process uniquely identifies the database query based on the fingerprint.

16. The system of claim 15, wherein the identified sub-portions further comprise a predicate, and the identifiers comprise an identifier assigned to the predicate.

17. The system of claim 15, wherein the data structure has a variable length, and wherein the fingerprint function is to output a value of a fixed length as a fingerprint regardless of a length of the data structure.

18. The system of claim 15, wherein the fingerprint function is based on one of:
a hash function;
a cryptographic hash function; and
a checksum function.

19. A method of a system comprising a hardware processor, comprising:
receiving a database query;
identifying sub-portions of the database query, wherein the sub-portions comprise one or more of an expression in the database query and an operator in the database query;
obtaining unique identifiers for the identified sub-portions based on one of:
accessing mapping information that maps different sub-portions to respective sub-portion identifiers that uniquely identify the respective sub-portions; and
applying a function to the respective sub-portions, wherein an output value produced by the function comprises a unique identifier of a corresponding sub-portion;
adding the unique identifiers for the identified sub-portions to a data structure;
generating a fingerprint representing the database query based on applying a fingerprint function to the identifiers in the data structure, the fingerprint function to produce a value of a fixed length as the fingerprint regardless of a length of the data structure; and
using, by a management process, the fingerprint to uniquely identify the database query.

20. The method of claim 19, wherein a length of the data structure is dependent upon a quantity of the unique identifiers added in the data structure.

* * * * *